March 2, 1971   A. K. CHITAYAT   3,567,320

NON-CONTACT OPTICAL MEASURING PROBE

Filed Dec. 23, 1968   2 Sheets-Sheet 1

*INVENTOR.*
ANWAR K. CHITAYAT
BY

March 2, 1971      A. K. CHITAYAT      3,567,320
NON-CONTACT OPTICAL MEASURING PROBE
Filed Dec. 23, 1968      2 Sheets-Sheet 2
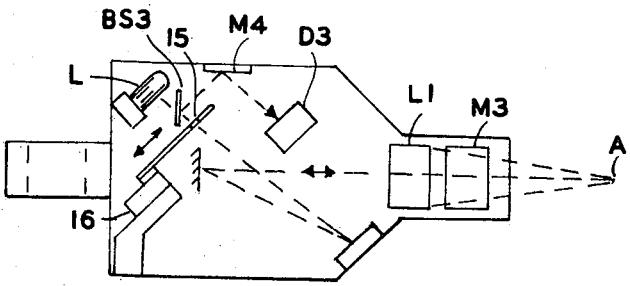
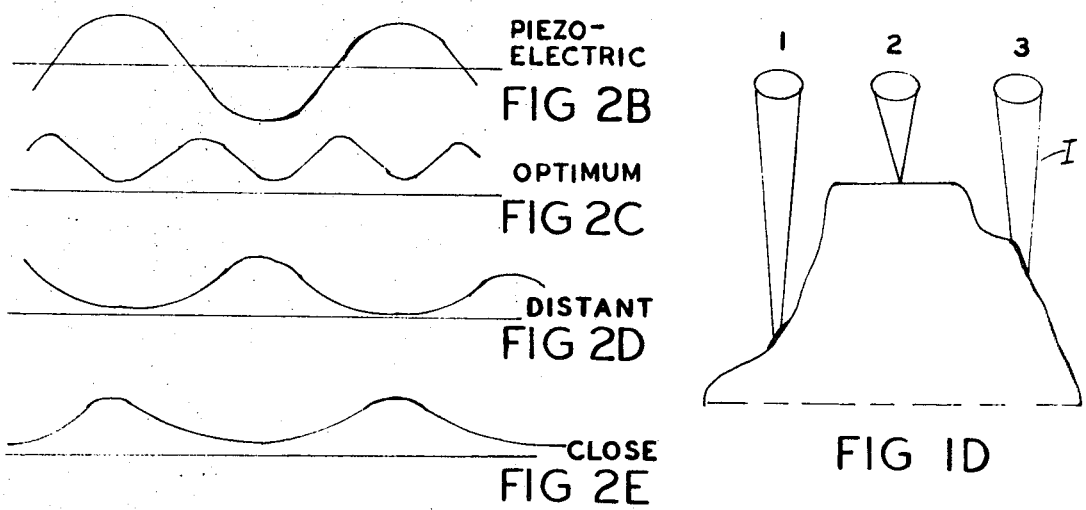
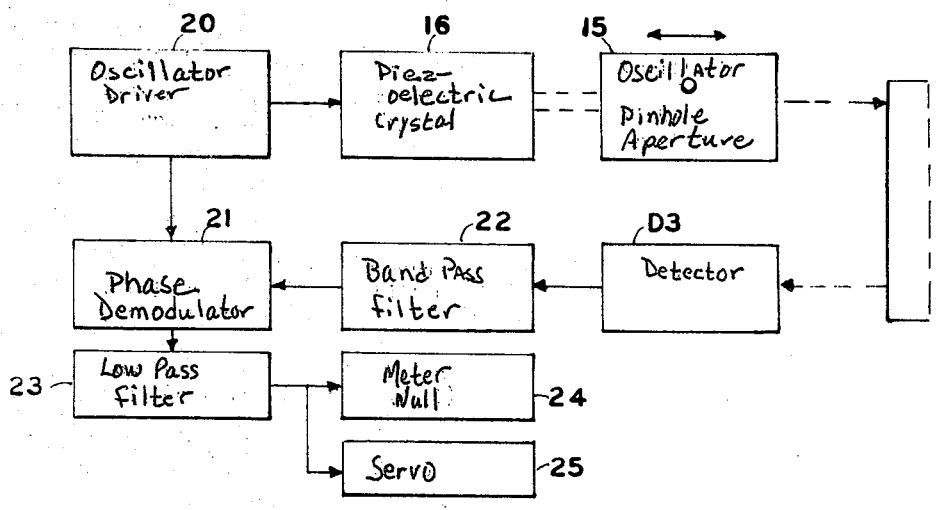
INVENTOR.
ANWAR K. CHITAYAT 3,567,320
NON-CONTACT OPTICAL MEASURING PROBE
Anwar K. Chitayat, Plainview, N.Y., assignor to
OPTOmechanisms, Inc., Plainview, N.Y.
Filed Dec. 23, 1968, Ser. No. 785,937
Int. Cl. G01c 3/08
U.S. Cl. 356—4                                           11 Claims

ABSTRACT OF THE DISCLOSURE

A light beam is passed through a pinhole and focused on the surface of an object. A color dispersing plate provides different wavelength components so that the illumination of one color long wavelength is focused at a greater distance than the average and the short wavelength components are focused at a shorter distance. The reflections from the surface are returned through the same lens and beam splitters to two detectors. One detector is filtered to pass the short wavelength and the other detector is filtered to pass the long wavelength. The detector outputs are then compared.

In a second embodiment, the pinhole is oscillated to change the focal length of the beam. Only one detector is used and the detector output is compared in phase with the oscillation voltage.

---

This invention relates to measuring probes, and more particularly, to measuring probes which use a light beam without any mechanical contact.

Measuring probes are used in machine tools for measuring distance such as depth, for instance, when measuring the profile of a surface. Older conventional probes are generally mechanical and actually touch the surface being measured. Other conventional probes use electric capacity measurement.

The present invention utilizes a beam of light which is focused at a pre-determined distance. Long wavelength color components and the short wave color components will focus at different distances on either side of the average focus point of the white light. Reflections of the long and short wave components are separately detected and the outputs of the detectors are used in a nulling system to give an accurate indication of distance.

The obvious disadvantage of the electro-mechanical probes is the fact it must contact the surface, thus producing uncertainty in the mechanical movement. It produces a force on the surface, which may mar the surface due to its own force, or may damage the surface due to mishandling. In many cases, it is inconvenient or impractical to place the probe tip on the object due to space limitations or due to interference of fixturing. Furthermore, the ball tip of a mechanical indicator will affect the accuracy of measurement of a three-dimensional surface, due to its appreciable ball diameter. The optical probe described herein has no mechanical contact surface.

The probe assembly is packaged so that it can be inserted in a machine tool using the conventional holding fixtures used for conventional probes.

The proposed approach has the following characteristics:

(1) Its size and shape is equivalent to conventional electronic probes, but has the same general configuration.

(2) It has the same means of mounting as a standard electronic probe. Consequently, standard adjustable clamps and fixturing can be used.

(3) It contains a rotatable mirror that allows 45 degree adjustment, or looking straight ahead.

(4) The electronic readout unit contains a meter and zero adjustment similar to that of electronic indicators.

Accordingly, a principal object of the invention is to provide new and improved non-contact measuring probe means.

Another object of the invention is to provide new and improved non-contact probe means for machine tools.

Another object of the invention is to provide new and improved non-contact probe means using a light beam having a plurality of different wavelength components and detector means for comparing the different components to provide an indication of distance of the probe from a reflecting object.

Another object of the invention is to provide new and improved non-contact probe means including a light beam source focused at a pre-determined distance, means to oscillate said light beam to modulate the focal length, means to detect the reflection of said light beam from said object, means to compare a phase of the detected response with the phase of the oscillating voltage.

These and other objects of the invention will be apparent from the following specification and drawings, of which:

FIGS. 1C and 1D are diagrams illustrating the theory of the embodiment of FIG. 1.

FIG. 2 is a plan view of another embodiment of the invention.

FIG. 2A is a schematic block diagram for the embodiment of FIG. 2.

FIGS. 2B, 2C, 2D, 2E are wave forms illustrating the operation of the embodiment of FIG. 2.

In order to achieve a high order of accuracy of measurement, a non-contacting nulling probe may be used. This probe is designed specifically for this application since the requirements are unique. Z axis measurement must be independent of the inclination to the model surface being measured. A mechanical contact point will introduce errors in the other axes proportional to the size of the contact point on an angled surface.

A standard probe using capacitance or optical means is usually dependent on the angle of the surface and reflectivity. Large errors are introduced, due to the non uniformity of the surface and angle of inclination. Moreover, this type of probe is usually placed in close proximity to the surface, so that it is possible for the probe to interfere with the surface being measured.

Figure 1:
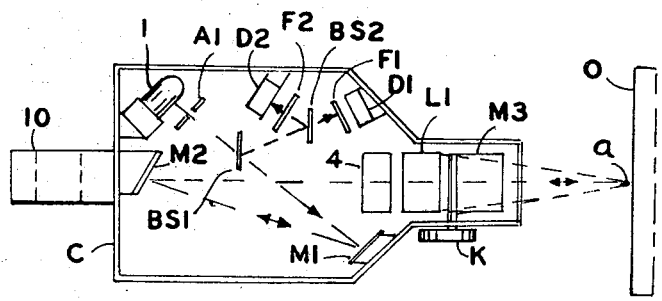
FIG. 1 is a plan view of an embodiment of the invention.

After detailed investigations, the optical electronic approach was selected. As shown in FIG. 1, a high intensity low voltage filament lamp 1 provides the illumination through a pinhole A1 which is imaged onto the model surface through the use of the objective lens L1. The size of the spot on the model is approximately .002". The illumination is partly diffused, and partly reflected back to the same objective lens. The objective lens then focuses the illumination to two detectors D1 and D2 through two beam splitters. Each detector is arranged to focus at slightly different distance from the objective lens. For instance, detector D1 is selected to focus at 6.000" from the objective, while detector D2 focuses at a point 6.004 from the objective.

More specifically, in order to achieve optimum contrast and high sensitivity to motion, the illumination is split into two colors, blue and red, which are then focussed at 6.000" and 6.004" respectively. Filters are then placed in front of each detector so that detector D1 only observes the red light, while the detector D2 observes the blue light. In this manner, if the model surface is at 6.004", the red spot is focussed precisely at this point hile the blue spot is out of focus. Consequently, the red sensitive detector reaches its peak signal, while the blue sensitive detector only sees a small portion of the defocussed illumination resulting in a very low signal. The opposite is true at 6.000".

Figure 1A:
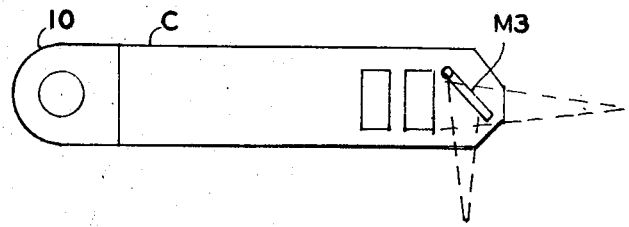
FIG. 1A is a side view of FIG. 1.
Figure 1C:
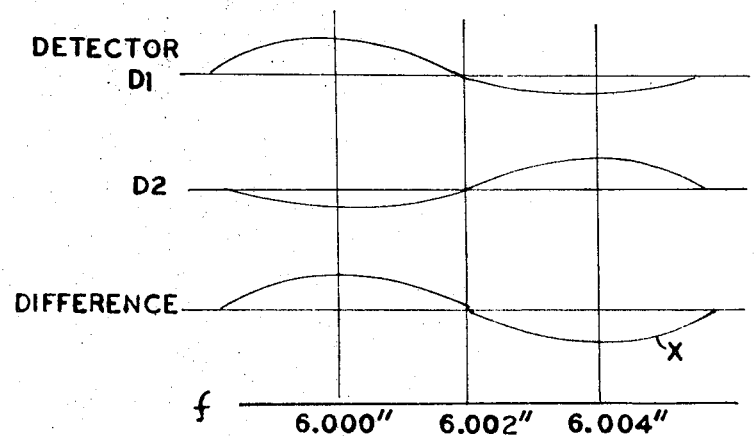

FIG. 1C illustrates the signal levels versus range.

Referring to FIGS. 1 and 1A, a light source 1 provides radiant energy, for instance white light. The light passes through a pinhole aperture A1 through beam splitter BS1 to mirror M1, then to mirror M2, then through color dispersing plate 4 and objective lens L1. The objective lens L1 focusses the light at a pre-determined distance, for instance, 6 inches from the end of the probe, illustrated by point $a$. Long wavelength components, for instance, red light, will focus at a greater distance and short wave components, for instance, violet light will focus at a shorter distance.

All of the light components are reflected from the object O and pass back through the lens L1 to mirror M2, then to mirror M1, then to beam splitter BS1 and then to beam splitter BS2, where the beam is split between detectors D1 and D2. Detector D1 has a short wave passing filter F1 in front of it and detector D2 has a long wave passing filter F2 in front of it.

All of the elements are mounted in a casing C having a mounting shaft 10 adapted to fit conventional holding fixtures.

A pivotally mounted mirror M3 is controlled by knob 7 to permit tilting the probe.

FIG. 1C illustrates the detector output levels versus range. Assuming the average wavelength is focussed at distance 6.002", the difference of the output of the detectors D1 and D2 will be shown by wave form X.

The difference of signals is used as a very accurate null detector. Thus, the difference approaches "zero" for a range of 6.002" (midway between the optimum focus of the two detectors). As the distance decreases, the "error signal" is positive. As the range increases, the error signal is negative. The probe is designed to be extremely sensitive to displacement in order to insure repeatability. The nulling detectors can be used to drive a servo motor to keep the non-contacting probe at the optimum distance of 6.002".

Figure 1B:
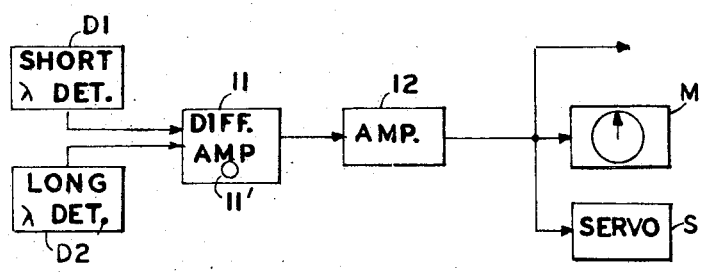
FIG. 1B is a block diagram illustrating the operation of the invention.

FIG. 1B illustrates the block diagram of a typical servo system. The error signals from the detector are amplified and applied to servo amplifier which in turn actuates the servo motor to drive the carriage. The error signals are maintained at null by the servo.

The advantages of the invention may be summarized below.

(1) The system accuracy is independent of linearity of detectors, since the errors are kept at null.

(2) Large changes in reflectance and diffusion of the surface can be tolerated. A painted surface is adequate for proper performance.

(3) Small changes in light intensity can be tolerated, since the difference between the detectors is measured and any increase or decrease of signal effects both detectors equally.

(4) The system accuracy is independent of orientation of the surface between the limits of ±90°. An example is given in FIG. 1D.

As shown in FIG. 1D, the system performs reliably in any of the three conditions illustrated. Even at a steep incline (position #1) or a near vertical surface (position #3), the system will operate. Thus, at position #3, only half the illumination I is detected, which has no effect, since both detectors are equally influenced. However, it must be realized here that if the servo has a maximum capability of 0.5"/sec. or 30"/minute, it cannot follow extremely sharp contours without loss of accuracy. An optional feature may be provided, whereby if the slope is too severe for the servo to follow, the error signal proportionally increases to trigger a relay, whereby the servo speed is automatically decreased. If the servo is still not able to follow the sharp contours, a visual and audible alarm can be supplied.

(5) The objective lenses can be interchanged with larger focal lengths to allow the working distance to be 12" or 18". However, a loss of accuracy will result. On the other hand, short focal length lenses allow the decrease of spot size so that higher sensitivity is realized with the disadvantage of shorter working distance.

FIG. 1B illustrates the block diagram where a difference amplifier 11 is used to measure the difference of signals of the detectors. The output is amplified by amplifier 12 and is presented on a meter M for display, or may be connected to a servo system S which may control the probe positon. Difference amplifier 11 has a zero adjustment 11'.

A second embodiment of the invention, FIG. 2, uses an oscillating pinhole aperture to continuously vary the focal length. The beam is reflected from the object and the reflection is detected. The detector response will be optimum at the average focal length. The detector response for a distance greater than the average focal length will have, for instance, a leading phase relation with the modulating or oscillating voltage and for a lesser distance than the average focal length, will have a lagging phase relation for closer objects.

This approach utilizes an illuminator L in front of which is located a pinhole aperture 15. This pinhole aperture is vibrated back and forth on a piezoelectric driver 16 which allows it to move in synchronism to the applied voltage shown in FIG. 2B. The optical system focusses the illumination of the pinhole through the objective lens L1 at point A. Now, as the voltage is applied on the piezoelectric driver, the pinhole 15 moves which in turn displaces the point of optimum focus, in and out at predetermined frequency. The illumination is focussed back through the same optical system and through a beam splitter BS3 and mirror M4 onto the detector D3.

FIG. 2A illustrates the block diagram of the system. The piezoelectric driver 16 is driven by oscillator 20 having a frequency of the order of 200 c.p.s., to move the pinhole. The detector senses the out-of-focus condition, in accordance with the diagrams of FIGS. 2B and 2E. It may be noted that if the surface being measured is at the optimum position, a harmonic frequency is generated, FIG. 2C, without any signal component in phase with the exciting frequency. On the other hand, if the surface is moved toward or away from the sensor, a signal component, as shown by FIG. 2D or FIG. 2E, of the basic frequency is generated. The phase determines the direction while the amplitude establishes the amount of displacement.

A phase demodulator 21 is used to detect the error from optimum. Oscillator 20 is connected to demodulator 21 and detector D3 is also connected to demodulator 21 through band pass filter 22. The output of demodulator 21 is connected to low pass filter 23 which is connected to null meter 24 or to a servo 25.

An optional added feature may be provided where the demodulator 21 signal is used to apply a DC voltage on the piezoelectric crystal driving it until it is in focus. The voltage applied on the crystal determines the exact amount of displacement.

The piezoelectric device can be replaced by a magnetic actuator. The electric signals change the magnetic hold resulting in a displacement identical to that described in the piezoelectric approach. Another means of imparting effective motion to the pinhole is to modulate an electro-optic crystal between the pinhole and objective lens. A voltage applied to the crystal affects its refractive index, essentially changing the optical path length.

The light source used in this system can be a laser source such as gallium-arsenide. This light source has the advantage of constant optical frequency, so that a filter may be placed in front of the detector to allow only those frequencies emitted by the laser. Consequently, the ambient illumination will be reduced appreciably.

Another possible innovation is to pulse the light source at a constant frequency. An electronic filter may then be used to allow only those signals having a similar wave shape as the pulse light source. This filtering technique is used to reduce noise not related to signal.

Many modifications may be made by those who desire to practice the invention without departing from the scope thereof, which is defined by the following claims.

What is claimed is:

1. A non-contact measuring probe comprising:
   a source of light beam,
   a pinhole aperture mounted in front of said source of light,
   a lens adapted to focus said light at a predetermined distance,
   color dispersion means mounted between said aperture and said lens,
   first detector means responsive to short wavelength components of said light beam,
   and second detector means responsive to long wavelength components of said light beam, whereby said light beam and its color components are reflected and detected by said first and second detector means.

2. Apparatus as in claim 1 having a pivotally mounted mirror in front of said lens to deflect said light beam.

3. Apparatus as in claim 1 having the means to measure the difference between the outputs of said first and second detectors.

4. Apparatus as in claim 1 wherein said light beam is directed to said first and second detectors by a beam splitter.

5. A non-contact measuring probe comprising:
   a source of light,
   means to vary the focal length of said light comprising a pinhole aperture oscillatably mounted in front of said source of light,
   a lens adapted to focus said light at a predetermined distance,
   means to oscillate said aperture at a reference frequen
   detector means responsive to reflections of said li beam from an object,
   and means responsive to said detector means and s reference frequency to measure the object distal from said probe.

6. Apparatus as in claim 5 wherein said means oscillate is a piezoelectric device.

7. Apparatus as in claim 5 having a pivotally moun mirror in front of said lens to deflect said light bea 8. A non-contact measuring probe comprising a sou of light beam,
   means to focus said light beam,
   means to modulate the focal length of said light bea
   means to detect modulated reflections of said light be from a reflecting surface,
   and means responsive to said modulated reflecti to measure the distance of said surface from s source.

9. Apparatus as in claim 8 wherein said modulati means is an oscillating pinhole aperture.

10. Apparatus as in claim 9 wherein said pinhole ap ture is driven by a piezoelectric device.

11. Apparatus as in claim 9 wherein said pinhole ap ture is driven by a magnetic device.

References Cited

UNITED STATES PATENTS

| 2,884,830 | 5/1959 | Hildebrand | 356- |
| 3,054,898 | 9/1962 | Westover et al. | 356— |
| 3,087,373 | 4/1963 | Poor et al. | 350— |
| 3,325,647 | 6/1967 | Sugier | 356— |

RODNEY D. BENNETT, JR., Primary Examiner

J. G. BAXTER, Assistant Examiner

U.S. Cl. X.R.

356—5